Figure 1:
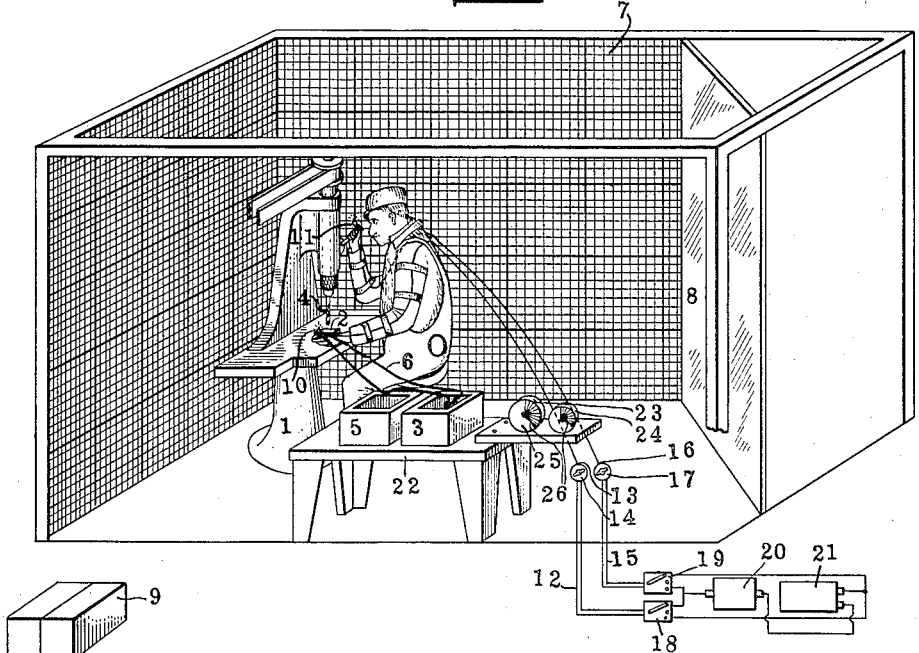

F. B. GILBRETH.
METHOD AND APPARATUS FOR THE STUDY AND CORRECTION OF MOTIONS.
APPLICATION FILED MAY 23, 1913.

1,199,980.
Patented Oct. 3, 1916.
2 SHEETS—SHEET 1.

WITNESSES:
Frank A. Kellar
Walter L. Muehlenbeck

INVENTOR
Frank B. Gilbreth
BY Wm. L. Morris
ATTORNEY

F. B. GILBRETH.
METHOD AND APPARATUS FOR THE STUDY AND CORRECTION OF MOTIONS.
APPLICATION FILED MAY 23, 1913.

1,199,980.

Patented Oct. 3, 1916.
2 SHEETS—SHEET 2.

WITNESSES:
Frank A. Kellar.
Walter L. Muehlenbeck

INVENTOR
Frank B. Gilbreth
BY
ATTORNEY

UNITED STATES PATENT OFFICE.

FRANK B. GILBRETH, OF PROVIDENCE, RHODE ISLAND.

METHOD AND APPARATUS FOR THE STUDY AND CORRECTION OF MOTIONS.

1,199,980.  Specification of Letters Patent.  Patented Oct. 3, 1916.

Application filed May 23, 1913. Serial No. 769,456.

*To all whom it may concern:*

Be it known that I, FRANK B. GILBRETH, a citizen of the United States of America, residing at Providence, county of Providence, and State of Rhode Island, have invented certain new and useful Improvements in Methods and Apparatus for the Study and Correction of Motions, of which the following is a specification.

The present invention relates to "time study" and "motion study."

More particularly, it relates to a method, apparatus and product for studying and standardizing the motions and operations of a moving object, whether the object be a man or other being, or a machine, or other mechanically actuated thing, or a combination of the two.

In the use of the invention, the motion or operation may actually be photographed, or permanently recorded: and all motions, and all operations or aggregations of a multiplicity of motions, may be studied in detail. They may be studied as to speed, variations in speed, acceleration, retardation, continuity, momentum, inertia, intermittency, periodicity and direction; and as to their paths or orbits of movement, cycles and rhythm; also as to retardation of speed due to the inertia of loads picked up; and acceleration and reflex action on release from loads. Where the operations are those of a man, the invention also permits study of any indecision or mental hesitancy on the part of the subject, as well as of presence or lack of nerve control; and of the effects of incentives, stimulants, foods, drugs and of fatigue; showing the time and duration of the same, and the periodicity of rests; and of error and recurrence of error; and of the causes of these mental and physical phenomena.

The invention is perhaps principally in the interest of economy of time and energy, and in the elimination of waste, in the multitude of operations involved in learning, and in performing, in the various industries and arts, and has for its object the discovery of the best and most efficient motions to be used in a given operation, and the standardization of such motions, so that there may be accomplished more quickly, more perfectly and more efficiently the "transfer of skill" of the most efficient operator to the beginners and others of lesser skill. It is well known that all industries suffer to a greater or less degree from waste and inefficiency, not only in their general methods, but in the individual methods of their workmen. Methods continue which have nothing but age to excuse their existence. A workman by habit and training may make a large number of unnecessary movements in performing an operation. The adopted method may necessarily involve delay and inefficiency. Furthermore, it is well known that certain men are not adapted, mentally or physically, for certain work. Tools in use, because of their character, shape and weight, or for other reasons, are not always the best suited for their intended work in the hands of the operator, and thus contribute to inefficiency. Through use of the present invention, all useless movements may be eliminated, and other movements modified or introduced to simplify an operation. An unskilled workman may be shown his faults, and effectively instructed in the correction of the same. Persons, inherently unsuited for any reason for the attempted work may be discovered and rejected, or placed where they will be most efficient. The defects of tools may be discovered and corrected. As the result, general methods may often be revolutionized, to the great saving and advantage of everybody concerned. The invention has other fields. It may be used to discover, measure and record, and thus permit of the elimination of vibration, play of parts, and of looseness due to wear or improper fitting of parts of machinery. Machinery, apparently unadapted for certain work, may, as the result of the study permitted by this invention, be modified and rendered quite adaptable and efficient. The vibration of the machinery may be studied with the idea of improving its design, running or operation, or for mere purpose of comparison.

In its characteristic feature, the invention consists in picturing or in photographing, and thus permanently recording, a movement or operation. An ordinary photograph or picture may show a moving object, but it shows that object in one position only. A so-called moving picture may show a complete movement, but no one panel or frame of the film shows any movement, and the film must be rapidly moved to produce the illusion of movement of the object. By the present invention, the complete movement may be shown by a single exposure, and in a single picture or photograph.

This invention is based on the principle that a bright moving object will show its path of movement against a relatively dark background, or vice versa. The length of the path so shown will depend upon the length of time of observation, or, in case of photography, upon the length of time of exposure. Providing the movement of the object is relatively rapid, the film may also be moved, and certain features of the observed motion thereby exaggerated for clearer study, or minimized. As hereinafter pointed out, a movement of the film may also be utilized as a measure of time of the operation.

In the particular presentaion of the invention hereinafter described, a light such, for instance, as an incandescent lamp is attached to the object whose movements are to be studied. A man operating and feeding a drill is shown with an incandescent lamp secured to the fore fingers of his hands. In the photograph the hand may not appear, but the path of movement of the light, and consequently of the hand, is clearly shown. The light, instead of being a steady light, may be an intermittent one, or one of variable intensity, the circuit of which is controlled by an intermittently acting contact device; and, in the latter event, the path of the light will be shown by a trail of dots, or of dots and dashes. The advantage of the intermittent light is at least threefold. In the first place, by counting the number of breaks in the path of the light, and knowing the speed of operation of the contact device, the time occupied in the operation may be determined. In the second place, the characteristics of the illuminations or flashes, relative to periodicity and frequency, may vary. For instance, where two hands, or two or more moving parts are to be observed, differently timed contact devices may be employed in the circuits of the different lights; so that the path of one light or moving part may, for instance, be shown by dots, and the path of another of the moving parts by dots and dashes, or by a different interval between dots, thus clearly distinguishing the movements of the two objects in the photograph. Confusion of one part of a cycle with another part, where the parts cross or lie close to one another, may also be avoided by use of a contact device which increases, or lessens the interval between flashes as the operation progresses. In the third place, the flashes caused by the contact device, particularly when intentionally made to be of diminishing intensity, serve to indicate the direction of movement. The flash appears on the photograph as of wedge-shape, showing largest at instant of "make," and thence attenuating to a fine or invisible line or point. In the course of each operation, therefore, the expanded part of an indicated dot or dash would follow the attenuated part of the preceding dash, and thus indicate the direction of movement. Of course, by suitable means, a "flash" might be made to grow brighter after being initiated, and then the converse of the above, as to direction, would be true. The photographs are preferably taken, as in my co-pending applicaton, Serial No. 698,130, filed May 18, 1912, stereoscopically, so as to show the movement in three dimensions: and mirrors and graduated backgrounds may be used for showing and measuring the movement in the three directions. The film or plate may be graduated as a means for measuring the movement.

The above and other features of the invention will more clearly appear upon reference to the accompanying drawings in which—

Figure 2:
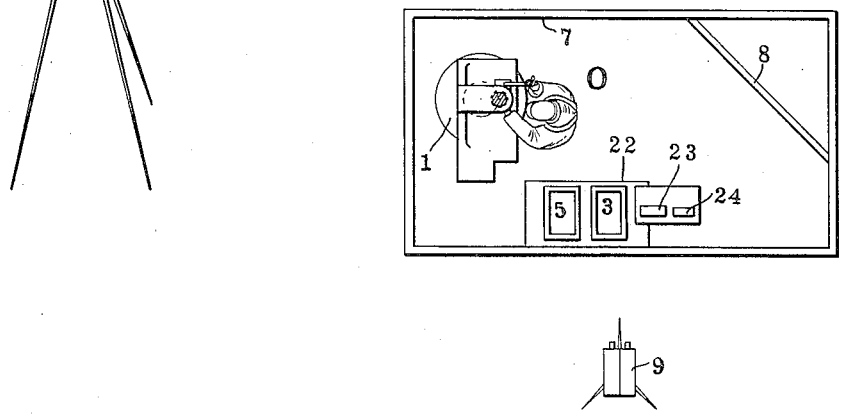
Figure 3:
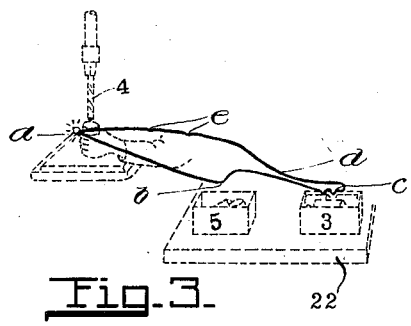
Figure 4:
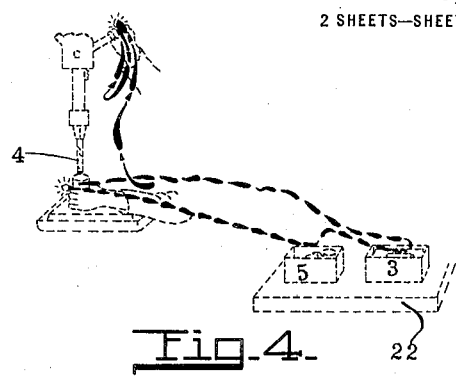
Figure 5:
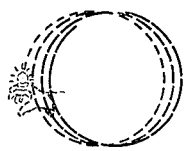
Figure 6:
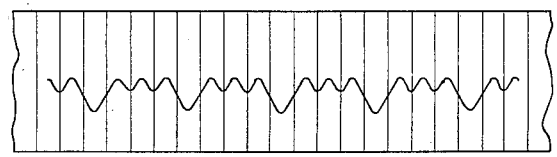
Figure 7:
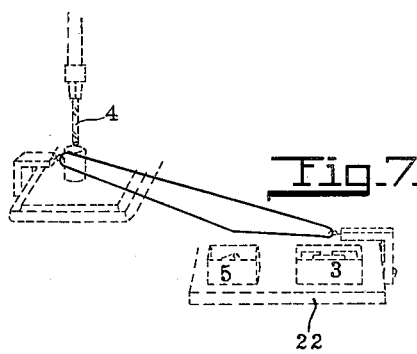

Figure 1 is a view in perspective of a man operating a drill, and feeding the same with blanks contained in a box. A mirror and graduated background are shown, to permit of measurement of the operator's movements in three directions; and the flash light equipment is also shown. Fig. 2 is a plan view, showing diagrammatically the positions of the objects in Fig. 1 with respect to the camera. Fig. 3 is a cyclegraph picture of a motion, the black line being a copy of the white line made on the photograph by a steady light attached to one hand of a drill operator. Fig. 4 is another motion picture, showing two broken lines, made respectively by flash lights attached, one to each hand of the operator, and controlled by differently timed contact devices, so that the lines may be distinguishable one from the other. Fig. 5 is a motion picture described by one flash light controlled by a contact device, the speed of operation of which decreases as the operation progresses, so that the interwoven cycles may be readily distinguishable. Fig. 6 is a motion picture described by a light attached to a rapidly vibrating mechanism, and taken on a moving film. Fig. 7 is a view in perspective showing a wire shaped to the proper path of movement of the operator's hand, rigged up in proper position at the drill for the instruction of the operator.

Referring to the drawings, and more particularly to Figs. 1 and 2, the operator O is shown in front of a drill 1. He is supposed with his left hand to take blanks 2, one at a time, from a box 3, convey them to the tool 4, of the drill, and, after the drilling operation, to discard the drilled piece in the box 5, whence his hand passes to the box 3 for another blank. With his right hand he operates the drill at the proper time. The path of movement of his left hand is indicated by the line 6. Behind the drill is a graduated background 7 against which the extent of the operator's hand movements may be measured; and at 8 is a mirror positioned to show by the reflections therefrom the movements in the third dimension or direction. A camera, preferably two cameras operated in synchronism are positioned as at 9 (Fig. 2) for taking photographs of the operation. When two cameras are used, the photographs are taken stereoscopically to picture the operation in three dimensions. The plates or films of the camera are preferably lined or graduated for measurement of the movement indicated in the photograph. On the table 22 are shown a pair of time pieces, 23 and 24, having white dials 25, and black hands 26, capable of rapid movement when the clock mechanism operates. These time pieces are so controlled that they may be set in operation any instant. One may be used to time one part of the operation, and the other to time another part of the operation. The time pieces are photographed with the rest of the apparatus, and the extent of movement of the black hands of the same during the operation is shown on the photograph by a blur on the dial of the time piece as indicated in the drawings.

On the forefingers of the hands of the operator are incandescent lights 10 and 11, respectively. Light 10 is on a circuit 12, leading to terminals 13 at a switch 14. Light 11 is on a circuit 15 leading to terminals 16 at a switch 17. By means of the switches, one or the other of the lights may be cut off at will. From the switches the circuits lead to rheostats 18 and 19, respectively, and thence to a contact device 20, whence the circuits lead to the battery or other electrical generating apparatus 21.

In taking the photographs, the setting is preferably relatively dark, so that the light may be clearly seen. Stationary objects may appear on the photograph, particularly where the exposure is comparatively long, but moving parts will not appear, except possibly as an indistinct blur, and except the lights. The line or trail of the light will stand out clearly. Upon reference to Fig. 3, it will be seen that the light was a steady light, because the line is unbroken and of uniform value. Starting arbitrarily at point $a$ on the line, representing the position of the drill tool, the line is comparatively smooth as far as the point $b$. At $b$, the operator's hand is over the box 5, and here he releases the drilled piece which he has been carrying. The sharp rise in the line at $b$ shows the reflex action of the hand due to the release of the load. From $b$ the line continues to $c$, where it is over the box 3. Here the operator must select another blank for the drill. The blur and twisting of the line at $c$ shows the delay in decision, or the mental hesitancy, of the operator in making his selection of a new blank. At $d$ there is a sag in the line, due to the weight of the blank; and thence the line is comparatively smooth to the point $a$, except that at points $e$ are slight riffles in the line, due to lack of muscular or nerve control on the part of the operator. If the operation were performed a large number of times, the line of the first operation and that of the last would look different in some respects. Less hesitancy might be indicated at $d$, and better muscular and nerve control might be found, provided the operator was not fatigued. If, on the other hand, the operator were fatigued, the converse might be true, and bends or twisting of the line would show failing strength and periods of rests. The line, when properly illustrated, particularly if illustrated in three dimensions, as by use of mirrors, or stereoscope, or both, will show whether or not the position of the operator is correct with respect to the tool, equipment, materials, and supply and discard receptacles; and rearrangement of positions or changes in the operation may be found desirable. This follows from the fact that each part of the line may be measured both as to distance and time occupied, and wasted time or energy thereby discerned.

In Fig. 4, two lines or operations are shown, one being described by the light on the operator's left hand, and the other by the light on the operator's right hand. These lines overlap and are interwoven, so that one line might be confused with the other were it not for the fact that one line is shown as a trail of dots or short dashes, whereas the other line is a trail of dots and longer dashes. Each of these lines is described by a flashing light, but the circuits of the two lights are in this instance controlled by differently operating contact devices. The dashes indicating the flashes appear of somewhat conical or wedge-shape. This shape has been purposely somewhat exaggerated on the drawings, but is none the less quite distinct on the actual photographs. Where the flash is produced by a make-and-break of the circuit, or where the current is first of considerable intensity, and then of less intensity, at each flash, the wide or heavy part of the dash will be the first recorded, and thereafter, as the light grows weaker, the dash will narrow. Such being the case, the dashes will taper in the direction of the movement of the lights, and will thus clearly indicate their direction. Knowing the number of contacts made by the contact device per second, the time occupied and speed of movement in any given part of the operation may be determined by counting the flashes registered in that part of the path, or by counting the makes and breaks of the contact device; and, if the speed is constant, the time occupied in any given part of the path may be determined by measuring the distance between flashes. In this last instance, however, measurements should be made from the heavy ends of the dashes, since the length of the dash, and position of its dying end, is often uncertain and variable, depending upon the brilliancy of the flash. The time between flashes may also be determined by dividing the time of exposure by the number of flashes. The light preferably flashes at a speed which will not quite show complete extinguishing, although closely approaching it; but the speed of the flashes should be such as to permit each flash to be recorded independently, regardless of the speed of the operation. Places of rest in the operation will be indicated by the brilliancy of the light at the point of the path where the rest occurs; and the brilliancy of the light may serve as a measure of the length of time of rest. Where time pieces, such as 23 and 24, are used, the total time of the operation may be indicated on a single time piece, or two or more time pieces may be used to record the times of different parts of the operation. If the film of the camera is made to move, this movement may be utilized as still another means of reckoning time.

In Fig. 5 there is but a single line, representing the movement of one hand only of the operator. The operation is such, however, that there are several turns or whirls in the line, and these overlap in such manner as would make the path difficult to follow were it not that the flashes were made to decrease in frequency as the operation progresses, thus clearly distinguishing the path of one whirl from that of another. To obtain this effect is simply a matter of arrangement of contacts on the contact device, or of gradually decreasing the speed of operation of the contact device. Of course the desired variation may be effected by increasing, instead of decreasing the frequency of the flashes as the operation progresses, or in other ways, as by variations in dots and dashes. This variation of flashes in a single line serves as an indication of direction of movement without reference to the shape of the marks representing the flashes.

Where the operation is sufficiently complicated, or the case is sufficiently difficult or important, it may be desirable to record sub-cycles or parts of the operation on one plate, or on one frame, or section of a film, and another part on another plate or film frame. In such case, the film may be moved as in a moving picture apparatus to present for exposure successive portions thereof. As heretofore stated, the known time between the movements of the film will indicate the time occupied in performing those parts of the operation recorded in the several exposures.

Where it is desired to analyze the vibrations of a piece of machinery, or other mechanical device, it may often be desirable to move the film, and sometimes to move it quite rapidly, because such vibrations may be extremely rapid, or confined within a small area in such manner as to be indistinguishable when recorded on a stationary film. No matter how rapid or minute the vibrations, if the film be moved fast enough, the vibrations as to each component thereof will be clearly recorded. Fig. 6 is a record of such a vibration. The lights to be attached to the vibrating parts may be as small as is desirable.

One of the principal objects of this invention has been stated to be the analysis, for purposes of correction, of the movements of a workman. After the operation has been studied and corrected, it is therefore important that the workman be instructed in the correct movements embraced within the operation. To this end, a wire is shaped to the true path of the proper movement, and is mounted in proper position at the machine, or wherever the operation is to be performed. The workman then trains himself in the correct movements by following the wire with his fingers. The instruction of the operator may be by means of lantern slides of the cyclegraph followed or preceded by micro-motion pictures showing detailed motions of the cyclegraph. A phonograph may be used in connection with the slides or films to explain features of the motion or operation. The description may be written on the plate or film, or on the photographs.

The invention has been described in certain of its aspects and modifications. It will be understood, however, that it is capable of being used in a great variety of other forms. The light, for instance, need not be a lamp carried by the moving object, but may be any illuminable substance annexed to the object. It may be a crystal, or the like, which gives light by reflection of rays from a source located at any suitable point. It may be convenient or desirable to place upon the moving object some fluorescent substance, or material treated with a fluorescent substance, which will become illuminated when acted upon by the ultra-violet or invisible rays of an arc or other light. In the latter instance, by means of a light screen, placed in front of the source of light, all rays may be absorbed except the rays intended to affect the fluorescence of the substance carried by the moving object. The flashes may be effected by actual flashing of the light; or in other ways, as by using a steady light, while moving a suitably perforated screen or a shutter either in front of the light, or between the film and the moving object.

I claim:

1. A method of studying the motions of moving objects consisting in annexing an illuminable substance to the object whose movements are to be studied, and causing said substance to be intermittently illuminated during the motion of the moving object.

2. A method of studying the motions of moving objects consisting in annexing an illuminable substance to the object whose movements are to be studied, causing said substance to be illuminated during the motion of the moving object and photographing on a plotted or graduated film or plate said illuminated substance during such movements.

3. A method of studying the motions of moving objects consisting in annexing an illuminable substance to the object whose movements are to be studied, causing said substance to be illuminated during the motion of the moving object, and during said movements photographing the direct rays from said illuminated substance to record the movements thereof in two directions, and photographing rays from said substance reflected from suitably positioned surfaces to record the movements in the third direction.

4. A method of studying the motions of moving objects, consisting in annexing an illuminable substance to the object whose movements are to be studied, and, during the motion of the moving object, intermittently illuminating said substance, said illuminations having different characteristics relative to periodicity and frequency to distinguish certain parts of the movement from other parts thereof, and photographing the trail of illuminations.

5. A method of studying the motions of moving objects, consisting in annexing an illuminable substance to the object whose movements are to be studied, and, during the motion of the moving object, intermittently illuminating said substance, said illuminations having characteristics relative to periodicity and frequency which are progressively altered during the operation, and photographing the trail of illuminations.

6. A method of studying the motions of a plurality of objects, consisting in annexing diversely illuminable substances to the several objects, and, during the motions thereof, causing said substances to be intermittently illuminated, so as to be distinguishable, and photographing said illuminations.

7. A method of studying the motions of a plurality of objects, consisting in annexing illuminable substances to the several objects, and, during the motions thereof, causing said substances to be intermittently illuminated, said illuminations on the several objects having different characteristics as to frequency and periodicity, so as to be distinguishable, and photographing said illuminations.

8. A method of studying the motions of moving objects, consisting in annexing an illuminable substance to the object, and during the motion of the object causing said substance to be illuminated differently at different parts of the movement, so that one part of the movement is distinguishable from another part thereof, and photographing said illuminations.

9. A method of studying the motions of moving objects, consisting in attaching a light to the moving object, and photographing the path or cycle described by the light during the movement of the object, said light being made to vary in intensity during the movement, to indicate upon the photograph the direction and other characteristics of the movement.

10. A method of studying the motions of moving objects, consisting in attaching a light to the moving object and photographing the path or cycle described by the light during the movement of the object, said light being caused to flash intermittently during the movement, and the several flashes being of changing intensity after initiation, whereby direction and other characteristics of the movement are recorded in the photograph.

11. A method of studying the motion of a moving object, consisting in taking on a film moving during exposure a picture of the cycle or path described by an illuminated substance annexed to the object whose motions are to be studied.

12. A method of studying the motions of a moving object consisting in taking on a film intermittently moving during exposure a picture of the cycle or path described by an illuminated substance annexed to the object whose motions are to be studied.

13. A method of studying the motions of a moving object consisting in taking on an intermittently moving film a picture of the cycle or path described by an illuminated substance annexed to the object whose motions are to be studied; certain sub-cycles or parts of said path of motion being taken on one frame or section of the film, and other sub-cycles or parts of said path of motion being taken on other frames or sections of said film, following the intermittent actions of the latter.

14. The method of determining the time of duration of movement, and the speed of a moving object, consisting in annexing to said object an illuminable substance causing said substance to flash at known frequency during the movement of the object, and recording the number of flashes.

15. The method of determining the length of cycle or path of movement, or of any part thereof, of a moving object, consisting in annexing to said object an illuminable substance, causing said substance to flash at known intervals, and recording the number of intervals or flashes in the part of the path of movement to be measured.

16. Apparatus for motion study consisting of an illuminable substance to be annexed to the moving object, means for causing said substance to flash intermittently, and means for taking photographs of said illuminated substance in motion.

17. Apparatus for motion study consisting of an illuminable substance to be annexed to the moving object, means for causing said substance to flash intermittently, said means being constructed and arranged to produce flashes of different lengths or intensities, and means for taking photographs of said illuminated substance in motion.

Signed by me at New York, this 30th day of April, 1913.

FRANK B. GILBRETH.

Witnesses:
De Witt Fox,
Basil Keller.